(12) United States Patent
Azuma et al.

(10) Patent No.: US 9,705,379 B2
(45) Date of Patent: Jul. 11, 2017

(54) DRIVING DEVICE

(71) Applicant: Nabtesco Corporation, Tokyo (JP)

(72) Inventors: Takahito Azuma, Tsu (JP); Hiroki Mizuhashi, Tsu (JP)

(73) Assignee: NABTESCO CORPORATION, Tokyo (JP)

( * ) Notice: Subject to any disclaimer, the term of this patent is extended or adjusted under 35 U.S.C. 154(b) by 601 days.

(21) Appl. No.: 14/354,271

(22) PCT Filed: Oct. 25, 2012

(86) PCT No.: PCT/JP2012/077600
§ 371 (c)(1),
(2) Date: Apr. 25, 2014

(87) PCT Pub. No.: WO2013/062047
PCT Pub. Date: May 2, 2013

(65) Prior Publication Data
US 2014/0260791 A1    Sep. 18, 2014

(30) Foreign Application Priority Data

Oct. 27, 2011  (JP) ................................. 2011-235929

(51) Int. Cl.
*H02K 7/116* (2006.01)
*H02K 21/24* (2006.01)
(Continued)

(52) U.S. Cl.
CPC ............. *H02K 7/116* (2013.01); *H02K 7/114* (2013.01); *H02K 16/00* (2013.01); *H02K 21/24* (2013.01);
(Continued)

(58) Field of Classification Search
CPC ........ H02K 7/116; H02K 16/00; H02K 7/102; F16H 2057/02034
(Continued)

(56) References Cited

U.S. PATENT DOCUMENTS 4,081,726 A * 3/1978 Brimer ................. D06F 37/304
310/166
6,876,113 B1    4/2005 Harris
(Continued)

FOREIGN PATENT DOCUMENTS

CN    1361578 A    7/2002
CN    101868648 A    10/2010
(Continued)

OTHER PUBLICATIONS

Office Action from the Japanese Patent Office dated Jun. 2, 2015 in related Japanese application No. 2011-235928, and translation thereof.
(Continued)

*Primary Examiner* — William C Joyce
(74) *Attorney, Agent, or Firm* — J-Tek Law PLLC; Jeffrey D. Tekanic; Scott T. Wakeman

(57) ABSTRACT

A driving device is provided with a gear unit and axial gap motors. The gear unit is provided with an input shaft and a driven member. The input shaft is supported by a supporting member. The input shaft is engaged with the driven member. Two axial gap motors are respectively attached to the input shaft so as to face each other.

13 Claims, 4 Drawing Sheets

(51) Int. Cl.
  *H02K 7/114* (2006.01)
  *H02K 16/00* (2006.01)
  *H02K 7/102* (2006.01)

(52) U.S. Cl.
  CPC ......... *H02K 7/102* (2013.01); *Y10T 74/19056* (2015.01)

(58) Field of Classification Search
  USPC .............. 74/421 A, 640; 475/149, 162, 178; 310/112
  See application file for complete search history.

(56) References Cited

U.S. PATENT DOCUMENTS

| | | | | |
|---|---|---|---|---|
| 8,393,424 | B2* | 3/2013 | Makino | F16H 1/32 180/65.51 |
| 8,621,958 | B2* | 1/2014 | Biester | F16K 31/047 310/112 |
| 2002/0113511 | A1 | 8/2002 | Daikoku et al. | |
| 2008/0176701 | A1 | 7/2008 | Yamamoto et al. | |
| 2009/0178506 | A1 | 7/2009 | Yamamoto et al. | |
| 2010/0080498 | A1 | 4/2010 | Tamura et al. | |
| 2010/0086248 | A1 | 4/2010 | Yamamoto et al. | |
| 2010/0292040 | A1 | 11/2010 | Yamamoto et al. | |
| 2011/0319219 | A1 | 12/2011 | Suzuki | |
| 2012/0006608 | A1 | 1/2012 | Suzuki | |
| 2012/0241233 | A1 | 9/2012 | Suzuki | |
| 2014/0312728 | A1 | 10/2014 | Azuma et al. | |
| 2016/0183836 | A1 | 6/2016 | Muuranto et al. | |

FOREIGN PATENT DOCUMENTS

| | | |
|---|---|---|
| CN | 101878583 A | 11/2010 |
| EP | 2234249 A | 9/2010 |
| JP | 2002262528 A | 9/2002 |
| JP | 2005321104 A | 11/2005 |
| JP | 2009-52630 A * | 3/2009 |
| JP | 2009159658 A | 7/2009 |
| JP | 2009159725 A | 7/2009 |
| JP | 2010014177 A | 1/2010 |
| WO | 2009081793 A | 7/2009 |

OTHER PUBLICATIONS

Office Action from the Japanese Patent Office dated Jun. 2, 2015 in related Japanese application No. 2011-235929, and translation thereof.

Office Action from the Taiwanese Patent Office dated Feb. 19, 2016 in counterpart Taiwanese application No. 101139768, and translation of substantive portions thereof.

Office Action from the Chinese Patent Office dated Dec. 22, 2015 in related Chinese application No. 201280052854.3, and translation of substantive portions thereof.

Office Action from the Chinese Patent Office dated Nov. 27, 2015 in related Chinese application No. 201280052833.1, and translation of substantive portions thereof.

English translation of International Preliminary Report on Patentability for parent application No. PCT/JP2012/0077600.

English translation of International Search Report for parent application No. PCT/JP2012/0077600.

Unpublished U.S. Appl. No. 14/354,262.

Office Action from the Taiwanese Patent Office dated May 23, 2016 in related Taiwanese application No. 101139769, and translation of substantive portions thereof.

Office Action mailed Jan. 11, 2017 in related U.S. Appl. No. 14/354,262.

P. R. Upadhyay, et al., Comparison of performance of the axial-field and radial field permanent magnet direct current motors using computer aided design and finite element methods, Journal of Applied Physics 97, 10Q506 (2005).

* cited by examiner

DRIVING DEVICE

CROSS-REFERENCE

This application is the US national stage of International Patent Application No. PCT/JP2012/077600 filed on Oct. 25, 2012, which claims priority to Japanese Patent Application No. 2011-235929 filed on Oct. 27, 2011, the contents of which are hereby incorporated by reference into the present application.

TECHNICAL FIELD

This application generally relates to a driving device provided with a gear unit and axial gap motors.

BACKGROUND ART

A driving member provided with an input shaft supported by a supporting member, and a driven member engaged with the input shaft is known. An example of this driving device is disclosed in International Publication WO 2009/081793. In the description below, International Publication WO2009/081793 is called Patent Document 1. The driving device of Patent Document 1 drives an input shaft using a thin flat motor.

SUMMARY OF THE INVENTION

In the technique of Patent Document 1, the input shaft is driven by using a radial gap motor. Thin radial gap motors cannot readily achieve large torque. Therefore, in case of using such a thin motor, it would be preferable to use an axial gap motor. However, since axial gap motors generate an attracting force between a rotor and a stator, a force in an axial direction would be exerted on the input shaft. When a force acting in the axial direction is applied to the input shaft, smooth rotation of the input shaft may be impeded. The present specification provides a driving device having a novel configuration that does not impede the smooth rotation of an input shaft in a driving device comprising axial gap motors.

A driving device disclosed in the present specification comprises a gear unit and axial gap motors. The gear unit comprises an input shaft and a driven member. The input shaft is supported by a supporting member. The input shaft is engaged with the driven member. In this driving device, two axial gap motors are respectively attached to the input shaft so as to face each other. According to this driving device, attracting forces occurring in the two axial gap motors balance one another, and therefore the input shaft rotates smoothly.

The techniques disclosed in the present specification can, in a driving device comprising axial gap motors, realize a driving device in which forces acting on an input shaft are balanced in an axial direction.

MODE(S) FOR CARRYING OUT THE INVENTION

Below, some technical features disclosed in the present specification will be noted. Moreover, the items described below have technical utility individually.

In a driving device disclosed in the present specification, the input shaft may extend from the driven member to both sides in an axial direction of the driven member. The axial gap motors may be respectively disposed at the two ends of the input shaft. The attracting forces of the motors act in opposite directions of one another at the two ends of the input shaft. Therefore, the input shaft can rotate more smoothly.

In a driving device disclosed in the present specification, a plurality of input shafts may be disposed at equal intervals in a circumferential direction of the supporting member. In this case, two axial gap motors may be attached, while facing each other, to only one of the plurality of input shafts. Alternatively, two axial gap motors may be attached, while facing each other, to each of the plurality of input shafts. In either case, the operation of the driven member can be stabilized. In the latter case, a large torque can be transmitted to the driving member.

Embodiments

In the following embodiments, a gear transmission will be described in which a plurality of crankshafts is engaged with an external gear, and axial gap motors are attached to each of the crankshafts. The techniques disclosed in the present specification can also be applied to a gear transmission in which a plurality of crankshafts is engaged with an internal gear, and axial gap motors are attached to each of the crankshafts. Further, the techniques can also be applied to a gear transmission in which a plurality of crankshafts is engaged with an external gear or an internal gear, and axial gap motors are attached to one crankshaft of the plurality of crankshafts.

Further, the techniques disclosed in the present specification can also be applied to a gear transmission in which one crankshaft is engaged with an external gear. That is, it should be noted that the techniques disclosed in the present specification can be applied to various types of driving devices as long as the driving device is a type which drives an input shaft by using an axial gap motor. Further, a gear transmission in which one of an internal gear and an external gear circles around the other of the gears while rotating eccentrically may be called a cycloidal reduction gear.

In the following embodiments, a gear transmission will be described having a form in which a crankshaft is offset from an axis of a carrier. However, the techniques disclosed in the present specification can also be applied to a gear transmission in which a crankshaft is coaxial with an axis of a carrier.

First Embodiment

Figure 1:
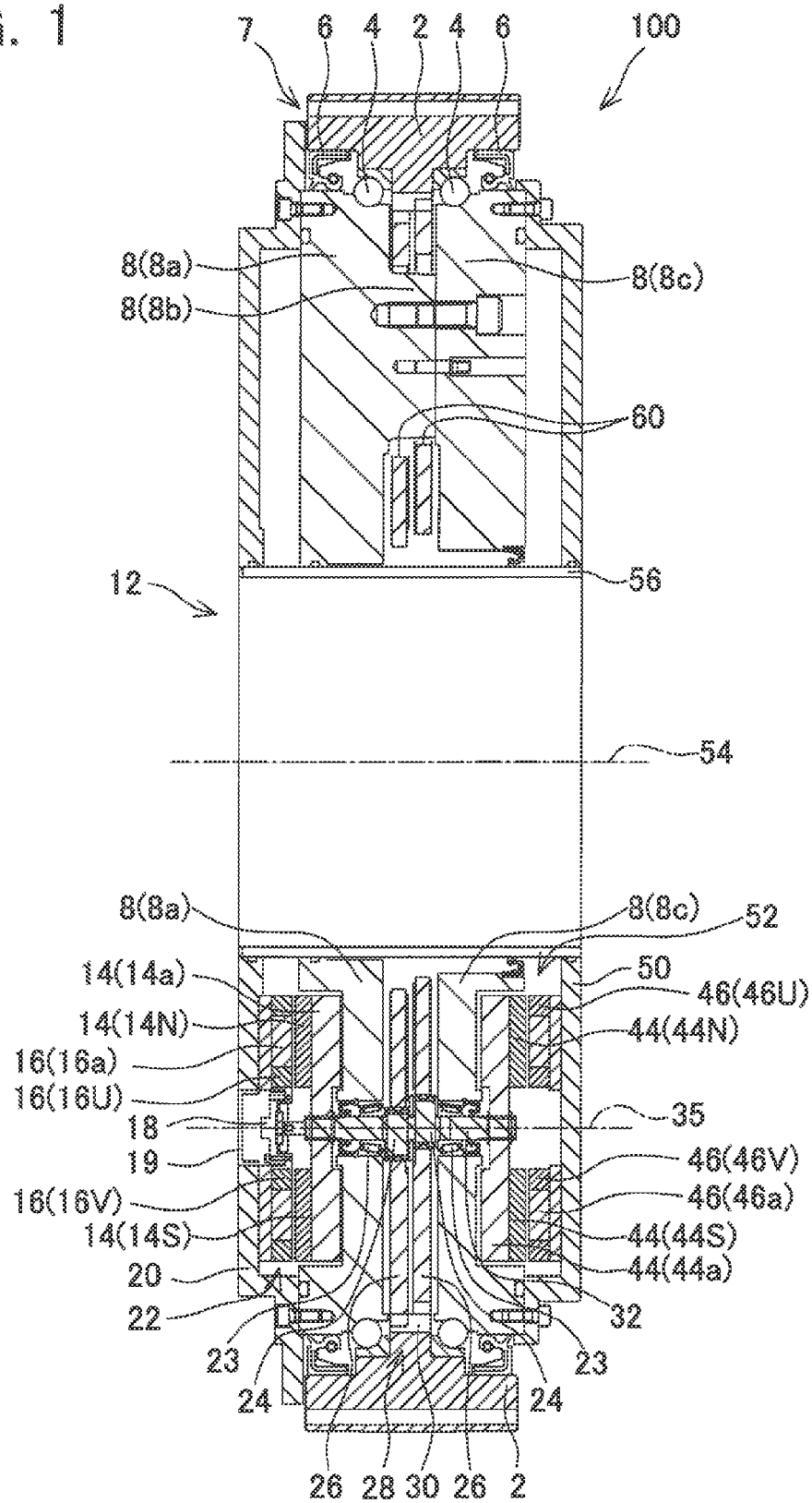
FIG. 1 shows a cross-sectional view of a driving device of a first embodiment.

The driving device 100 shown in FIG. 1 comprises a gear unit 7 and two axial gap motors 22, 52. The gear unit 7 is a gear transmission in which external gears 26 rotate eccentrically while meshing with an internal gear 28. The gear unit 7 comprises two external gears 26. In the gear unit 7, a carrier 8 rotates in accordance with the difference in the number of teeth of the external gears 26 and the number of teeth of the internal gear 28. The internal gear 28 is comprised of a case 2, and a plurality of internal-teeth pins 30 disposed on an inner circumference of the case 2.

The gear unit 7 comprises the case 2, the carrier 8, crankshafts 32, and the external gears 26. The carrier 8 corresponds to a supporting member, the crankshafts 32 correspond to input shafts, and the external gears 26 correspond to driven members. The carrier 8 comprises a first plate 8a and a second plate 8c. A gap exists between the first plate 8a and the second plate 8c. A columnar part 8b extends from the first plate 8a toward the second plate 8c. The columnar part 8b and the second plate 8c are affixed. The columnar part 8b passes through a through hole 60 of the external gears 26. The external gears 26 are disposed between the first plate 8a and the second plate 8c. The carrier 8 is supported coaxially with the case 2 by a pair of angular contact ball bearings 4. Axis 54 corresponds to an axis of the carrier 8. The axis 54 also corresponds to an axis of the internal gear 28 (the case 2).

An oil seal 6 is disposed between the case 2 and the carrier 8. A first motor housing 50 and a second motor housing 20 are affixed to the two ends in the axis 54 direction of the carrier 8. A through hole is formed through the carrier 8 and through centers of the first motor housing 50 and the second motor housing 20. A cylindrical shaft 56 fits into the through hole. Consequently, the driving device 100 comprises through hole 12 along the axis 54.

Each crankshaft 32 is supported by the carrier 8 via a pair of bearings 23. The bearings 23 are tapered roller bearings. The crankshaft(s) 32 extend(s) parallel to the axis 54 at (a) position(s) offset from the axis 54. The crankshaft(s) 32 comprise(s) two eccentric members 24. The two eccentric members 24 are engaged with the respective external gears 26. The two eccentric members 24 are eccentric in opposite directions of one another relative to an axis 35 of the crankshaft 32. The crankshaft(s) 32 extend(s) to both sides, in the direction of the axis 35, from the eccentric members 24. In other words, the crankshaft(s) 32 extend(s) from the external gears 26 to both sides in the axial direction of the external gears 26.

A first axial gap motor 52 and a second axial gap motor 22 are attached to respective ends of the crankshaft(s) 32. Further, an encoder 18 is attached to one end of a crankshaft 32. A through hole is formed in the second motor housing 20 outwardly from the encoder 18 in the direction of the axis 35. A cap 19 is attached to this through hole.

The first axial gap motor(s) 52 and the second axial gap motor(s) 22 are disposed facing each other. The phase angle of the first axial gap motor(s) 52 and the phase angle of the second axial gap motor(s) 22 are aligned. Therefore, the crankshaft(s) 32 rotate(s) smoothly. As will be described in detail later, the gear unit 7 comprises three crankshafts 32. The three crankshafts 32 are disposed at equal intervals around the axis 54. In other words, the three crankshafts 32 are disposed at equal intervals in the circumferential direction of the carrier 8.

The first axial gap motors 52 and the second axial gap motors 22 are respectively attached to the three crankshafts 32. The phase angles of the axial gap motors 52, 22 attached to the three crankshafts 32 are all aligned. Since the phase angles of all the axial gap motors are aligned, all of the axial gap motors can be controlled by one motor driver (not shown). The encoder 18 is attached to one of the three crankshafts 32. A brake (not shown) is attached to the other two crankshafts 32.

Figure 2:
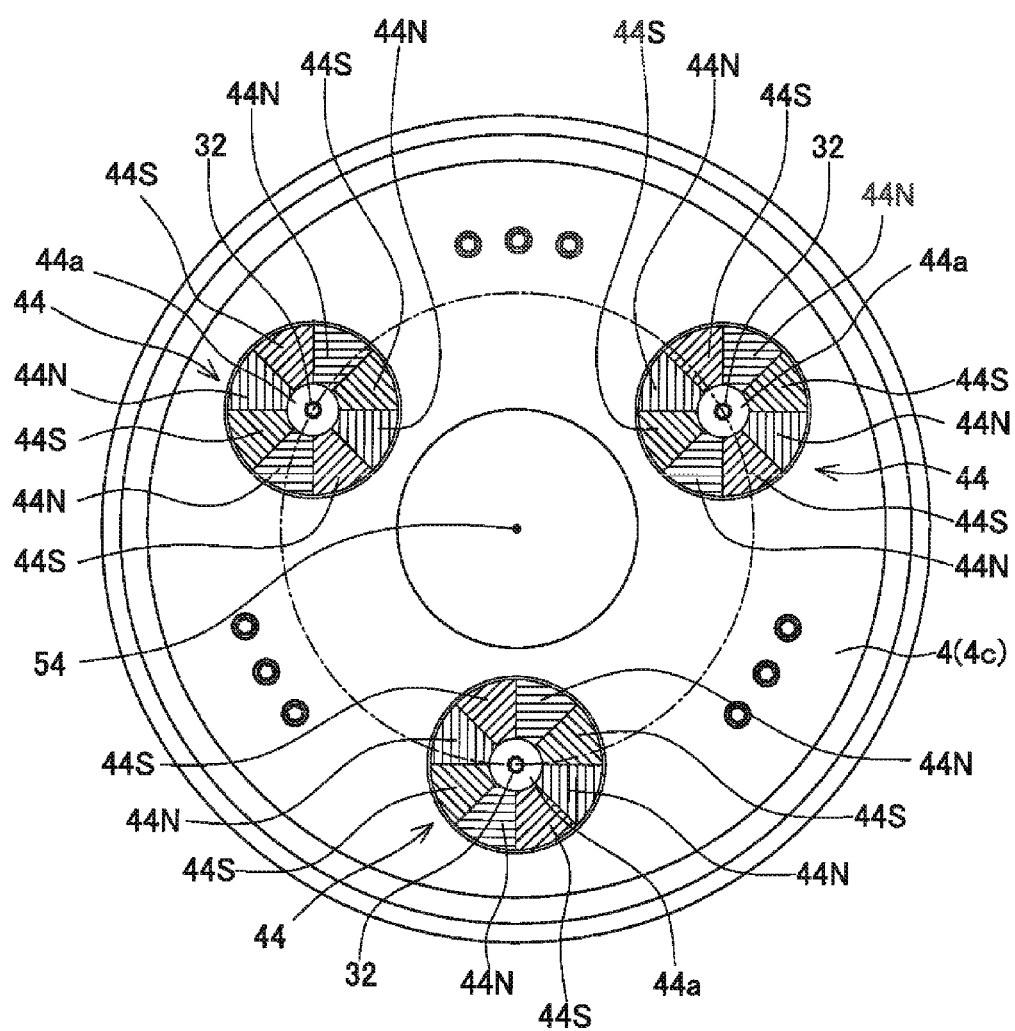
FIG. 2 shows a plan view of a gear unit, in the driving device of the first embodiment, in a state where a housing has been removed from a supporting member.

The first axial gap motors 52 are comprised of first rotors 44 and first stators 46. The first rotors 44 are attached to the crankshafts 32. As shown in FIG. 2, the first rotors 44 are respectively attached to the three crankshafts 32. The three crankshafts 32 are disposed at equal intervals around the axis 54. Similarly, the three first rotors 44 are disposed at equal intervals around the axis 54. Permanent magnets 44N and permanent magnets 44S are arranged alternately on each of the first rotors 44. The permanent magnets 44N are affixed to a surface of a plate 44a, and the N poles thereof face outward (see also FIG. 1). The permanent magnets 44S are affixed to the surface of the plate 44a, and the S poles thereof face outward. The angle of the first rotor 44 relative to the crankshaft 32 is equal in all of the first rotors 44. In other words, the positions of the N poles and S poles relative to the crankshaft 32 are equal in all of the first rotors 44. The crankshafts 32 and the first rotors 44 are coupled by splines having pluralities of grooves.

Figure 3:
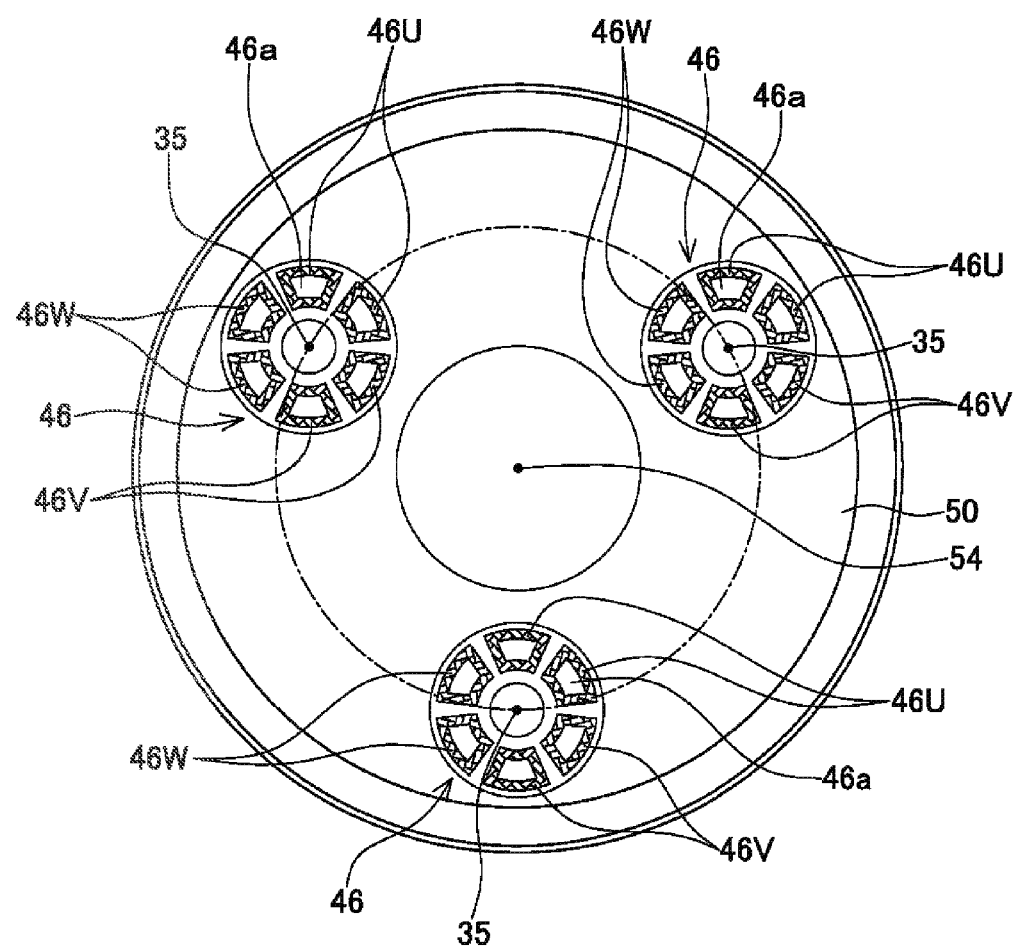
FIG. 3 shows a plan view of the housing, in the driving device of the first embodiment, which has been removed from the supporting member.

As shown in FIG. 3, the three first stators 46 are attached to the first motor housing 50. The three first stators 46 are disposed at equal intervals around the axis 54. The centers of the first stators 46 respectively match the axes 35 of the crankshafts 32 (see also FIG. 1). Each of the first stators 46 comprises a winding 46U through which U phase current flows, a winding 46V though which V phase current flows, and a winding 46W through which W phase current flows. The windings 46U, 46V and 46W are wound around (a) stator core(s) 46a. The stator cores 46a are formed of a magnetic powder core. The angle of the first stator 46 relative to the first motor housing 50 is equal in all of the first stators 46. In other words, the positions at which the windings 46U, 46V and 46W are attached (rotation angle) relative to the axis 35 of the crankshaft are equal in all of the first stators 46. The first stators 46 are attached to the first motor housing 50 by affixing the stator cores 46a to the first motor housing 50 using adhesive. Moreover, in FIG. 1 the windings 46U, 46V are shown, but the winding 46W is not shown.

As shown in FIG. 1, the second axial gap motors 22 are comprised of a second rotor 14 and a second stator 16. The second rotors 14 comprise permanent magnets 14N in which the N poles face outward, and permanent magnets 14S in which the S poles face outward. The permanent magnets 14N, 14S are affixed to a surface of a plate 14a. Each of the second stators 16 comprises a winding 16U through which U phase current flows, a winding 16V through which V phase current flows, and a winding 16W through which W phase current flows. The windings 16U, 16V and 16W are wound around (a) stator core(s) 16a. In FIG. 1, the windings 16U, 16V are shown, and the winding 16W is not shown.

The configuration of the second axial gap motors 22 is essentially the same as the first axial gap motors 52. Therefore, a detailed description of the second axial gap motors 22 is omitted. Moreover, when viewing the axial gap motors 22, 52 from the direction of the axis 35, the permanent magnets 14N and the permanent magnets 44N are disposed so as to overlap. Similarly, the permanent magnets 14S and the permanent magnets 44S are disposed so as to overlap. Further, the winding 16U and the winding 46U are disposed so as to overlap, the winding 16V and the winding 46V are disposed so as to overlap, and the winding 16W and the winding 46W are disposed so as to overlap.

When the crankshafts 32 rotate, the eccentric members 24 rotate eccentrically around the axes 35. Following the eccentric rotation of the eccentric members 24, the external gears 26 rotate eccentrically around the axis 54 while meshing with the internal gear 28. The number of teeth of the external gears 26 and the number of teeth of the internal gear 28 (the number of internal-teeth pins 30) are different. Therefore, when the external gears 26 rotate eccentrically, the carrier 8 rotates relative to the internal gear 28 (the case 2) in accordance with the difference in the number of teeth of the external gears 26 and the internal gear 28.

Features of the driving device 100 will be described. In the description below, features shared by the first axial gap motors 52 and the second axial gap motors 22 may be described only for the first axial gap motor 52, and a description of the second axial gap motor 22 may be omitted. As described above, each of the first rotors 44 is affixed to the respective crankshaft 32, and each of the first stators 46 is affixed to the first motor housing 50. The first motor housing 50 can be removed from the carrier 8 which is supporting the crankshafts 32. Therefore, the operation of affixing the first rotors 44 to the crankshafts 32, and the operation of affixing the first stators 46 to the first motor housing 50 can be performed separately. Since the crankshafts 32 are supported by the carrier 8, the first rotors 44 can be said to be positioned relative to the carrier 8.

To concisely state the features of the driving device 100, the part (the carrier 8) for attaching the first rotors 44, and the part (the first motor housing 50) for attaching the first stators 46 are separate parts which can be detachably attached. The first rotors 44 are positioned by being attached to the carrier 8. The first stators 46 are positioned by being attached to the first motor housing 50. The operation of positioning the first rotors 44 relative to the carrier 8, and the operation of positioning the first stators 46 relative to the first motor housing 50 can be performed easily. When the first motor housing 50 is attached to the carrier 8, the phase angles of the first rotors 44 relative to the first stators 46 are aligned in all of the first axial gap motors 52.

For example, in case both the rotors and the stators are to be positioned relative to the carrier, the stators must be affixed to the carrier while also aligning the phase angles of the rotors relative to the stators. This type of operation is difficult. Consequently, normally the stators are first affixed to the carrier while the rotors are in a state of being temporarily fixed to the crankshafts. Next, the rotors are affixed to the crankshafts in the state of aligning the phase angles of the rotors by flowing current therethrough. By making the part to which the rotors are attached and the part to which the stators are attached as detachable separate parts, the techniques disclosed in the present specification can produce a driving device according to a simple method.

Other features of the driving device 100 will be described. As described above, the first axial gap motor(s) 52 and the second axial gap motor(s) 22 are disposed facing each other. In the case of axial gap motors, an attracting force acts between the rotors and the stators. When only one axial gap motor is attached to a crankshaft 32, a force in the direction of the axis 35 acts on the crankshaft 32. By disposing the two axial gap motors 52, 22 facing each other on the crankshaft 32, the attracting forces of the two axial gap motors 52, 22 cancel each other. Specifically, the attracting forces of the two axial gap motors 52, 22 act on the crankshaft 32 in opposite directions of one another at the two ends of the crankshaft 32. The balance of the force(s) applied to the crankshaft 32 improves, and the crankshaft 32 rotates smoothly.

The first axial gap motor 52 and the second axial gap motor 22 are disposed at the two ends of the crankshaft 32. In other words, the first axial gap motor 52 is disposed on the opposite side from the second axial gap motor 22 relative to the external gears 26. More specifically, the axial gap motors 52, 22 are fixed to the crankshafts 32 on the outside, in the direction of the axis 35, of the pair of bearings (tapered roller bearings) 23. The first rotors 44 (the second rotors 14) can be affixed to the crankshafts 32 while the crankshafts 32 are being supported by the carrier 8.

Further, by attaching the axial gap motors 52, 22 at the two ends of a crankshaft 32, the first stator 46 and the second stator 16 can be disposed at the two ends of the axis 35. By disposing the axial gap motors 52, 22 at the two ends of the crankshaft(s) 32, the phase angles of the first rotors 44 (the second rotors 14) relative to the first stators 46 (the second stators 16) can be aligned easily by using the first motor housing 50 and the second motor housing 20.

The position(s) of the first axial gap motor(s) 52 and the position(s) of the second axial gap motor(s) 22 can also be expressed as follows. The first axial gap motor(s) 52 is (are) disposed at one end of the crankshaft(s) 32, and the second axial gap motor(s) 22 is (are) disposed at the other end of the crankshaft(s) 32. The first rotor(s) 44 and the second rotor(s) 14 are disposed between the first stator(s) 46 and the second stator(s) 16. The external gears 26 are disposed between the first rotor(s) 44 and the second rotor(s) 14. The first rotor(s) 44 is (are) disposed on the opposite side from the second stator(s) 16 relative to the second rotor(s) 14. The first stator(s) 46 is (are) disposed on the opposite side from the second rotor(s) 14 relative to the first rotor(s) 44.

Second Embodiment

Figure 4:
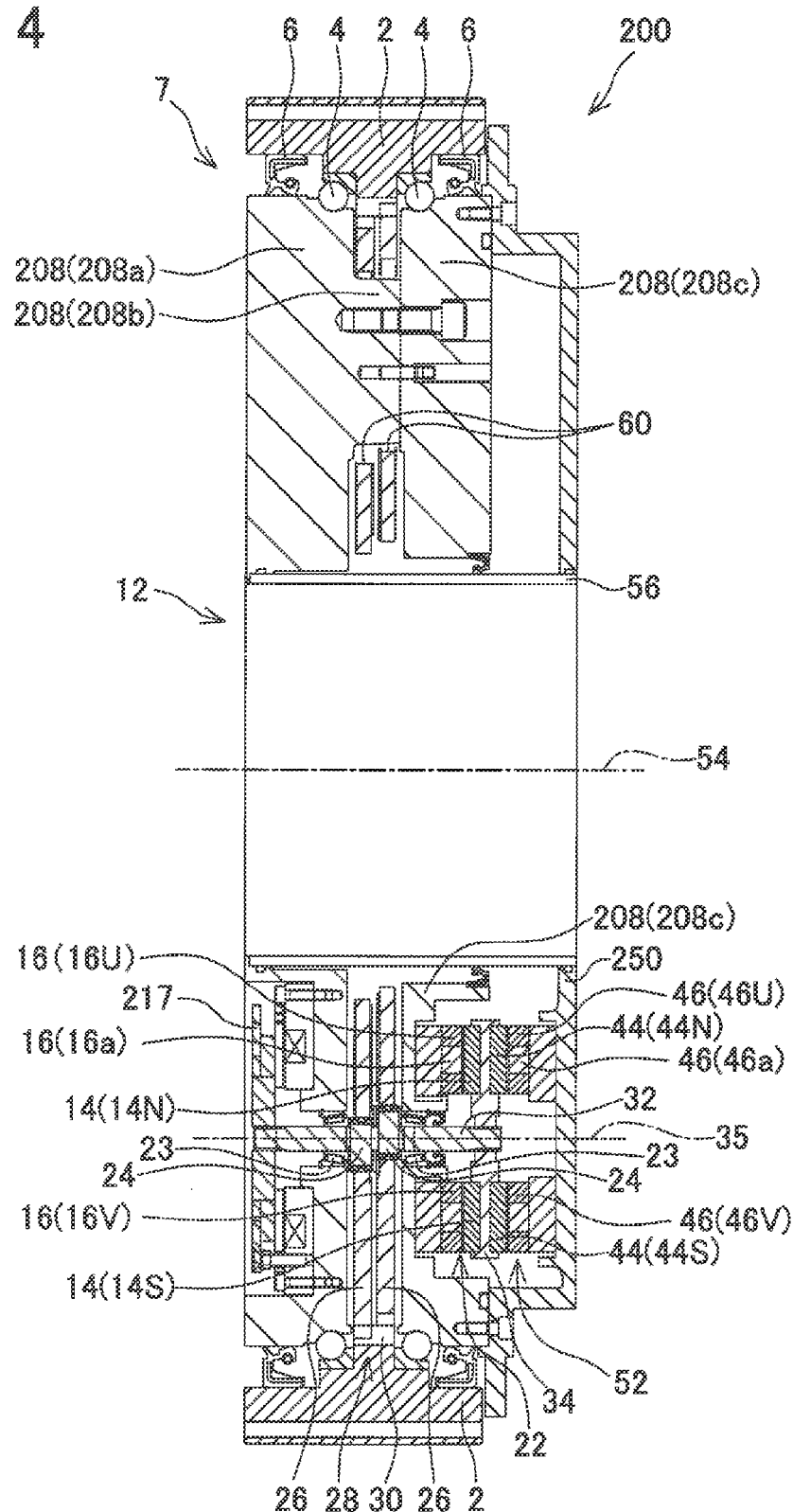
FIG. 4 shows a cross-sectional view of a driving device of a second embodiment.

Driving device (gear transmission) 200 will be described with reference to FIG. 4. The driving device 200 is a variant of the driving device 100. For the driving device 200, parts which are identical to those of the driving device 100 have reference numbers that are the same or have the same last two digits appended thereto, and an explanation thereof is omitted.

In the driving device 200, the first axial gap motor(s) 52 and the second axial gap motor(s) 22 are fixed to the crankshaft(s) 32 on the same side relative to the external gears 26. More specifically, the first axial gap motor(s) 52 is (are) disposed at one end of the crankshaft(s) 32. Further, the second axial gap motor(s) 22 is (are) disposed between the external gears 26 and the first axial gap motor(s) 52. A brake 217 is attached at the other end of the crankshaft 32. The driving device 200 also comprises three crankshafts 32. The brake 217 is attached to two of the three crankshafts 32. An encoder (not shown) is attached to the remaining one of the crankshafts 32.

In the driving device 200, as described above, two axial gap motors are disposed at the one end of the crankshaft(s) 32 in the direction of the axis 35. Consequently, a space for attaching a large-diameter brake 217 can be maintained at the other end of the crankshaft 32. Moreover, in the driving device 200 as well, the first axial gap motor(s) 52 and the second axial gap motor(s) 22 face one another. The attracting forces of the two axial gap motors 22, 52 act on the crankshaft 32 in opposite directions of one another. The attracting force of the first axial gap motor 52 and the attracting force of the second axial gap motor 22 cancel each other. Thus, the crankshaft(s) 32 can rotate smoothly.

In the driving device 200, the first rotor(s) 44 and the second rotor(s) 14 are integrated. More specifically, the permanent magnets 44N, 44S are affixed to one surface of a plate 34, and the permanent magnets 14N, 14S are affixed to the other surface (the opposite surface) of the plate 34. The first rotor(s) 44 is (are) formed by the permanent magnets 44N, 44S and the plate 34, and the second rotor(s) 14 is (are)

formed by the permanent magnets 14N, 14S and the plate 34. That is, the first rotor(s) 44 and the second rotor(s) 14 use the common plate 34.

In the driving device 200, the first stator(s) 46 is (are) affixed to a first motor flange 250, and the second stator(s) 16 are fixed to a carrier 208. When the first motor flange 250 has been affixed to the carrier 208, the second stator(s) 16 is (are) affixed to the carrier 208 such that the winding(s) 46U of the first stator(s) 46 and the winding(s) 16U of the second stator(s) 16, the winding(s) 46V of the first stator(s) 46 and the winding(s) 16V of the second stator(s) 16, and the winding(s) 46W (not shown) of the first stator(s) 46 and the winding(s) 16W (not shown) of the second stator(s) 16 each face one another.

Considerations concerning the embodiments will be given. Curable resin, a bolt, etc. can be used instead of adhesive to affix the stator cores to the motor flange. Alternatively, the stator cores and the motor flange may be molded integrally by using resin.

In the first and second embodiments, the rotors of the two axial gap motors face one another on each of the crankshafts. The stators of the two axial gap motors may face one another. That is, the two stators may be disposed between the two rotors.

Specific examples of the present invention are described above in detail, but these examples are merely illustrative and place no limitation on the scope of the patent claims. The technology described in the patent claims also encompasses various changes and modifications to the specific examples described above. The technical elements explained in the present specification or drawings provide technical utility either independently or through various combinations. The present invention is not limited to the combinations described at the time the claims are filed. Further, the purpose of the examples illustrated by the present specification or drawings is to satisfy multiple objectives simultaneously, and satisfying any one of those objectives gives technical utility to the present invention.

The invention claimed is:

1. A driving device comprising a gear unit and axial gap motors, the gear unit comprising:
an input shaft supported by a supporting member;
a driven member engaged with the input shaft; and
first and second axial gap motors attached to the input shaft so as to face each other wherein:
the input shaft axially extends beyond both sides of the driven member,
the first and second axial gap motors are both attached to one end of the input shaft between a first axial end of the input shaft and the driven member, and
a brake is attached to a second axial end of the input shaft.

2. The driving device according to claim 1, wherein the input shaft is one of a plurality of input shafts.

3. The driving device according to claim 2, wherein
the first axial gap motor is one of a plurality of first axial gap motors,
the second axial gap motor is one of a plurality of second axial gap motors, and
each of the input shafts has one of the first axial gap motors and one of the second axial gap motors attached thereto so as to face each other.

4. The driving device according to claim 3, wherein
the input shafts each axially extend beyond both sides of the driven member, and
each input shaft has one of the first axial gap motors and one of the second axial gap motors both attached to one end of the input shaft between a first axial end of the input shaft and the driven member.

5. The driving device according to claim 4, further comprising wherein:
the brake is attached to the second axial end of at least two of the input shafts.

6. The device according to claim 1, wherein:
the axial gap motors comprise a plurality of first axial gap motors and a plurality of second axial gap motors, each axial gap motor having a rotor and a stator,
the input shaft is one of a plurality of input shafts and
each of the input shafts has one of the first axial gap motors and one of the second axial gap motors attached thereto such that either the rotors or the stators of the first and the second axial gap motors are disposed so as to face each other.

7. The device according to claim 6, wherein:
the input shafts each protrude from both axial sides of the driven member, and
each set of one of the first axial gap motors and the second axial gap motors is disposed at one axial end of each of the input shafts.

8. A device comprising:
a first axial gap motor and a second axial gap motor, each motor having a rotor and a stator,
a carrier,
at least one crankshaft rotatably supported by the carrier and being connected to the rotors of the first and second axial gap motors; and
at least one external gear engaged with the at least one crankshaft and being drivable thereby;
wherein the first and second axial gap motors are attached to the at least one crankshaft so as to face each other,
the first and second axial gap motors are disposed between the carrier and a first axial end of the crankshaft, and
a brake is disposed on the second axial end of the crankshaft.

9. The device according to claim 8, wherein either the respective rotors or the respective stators of the first and the second axial gap motors directly oppose each other.

10. The device according to claim 8, wherein the at least one crankshaft extends through the carrier such that the first axial end of the crankshaft is disposed on a first axial side of the carrier and the second axial end of the crankshaft is disposed on a second, opposite axial side of the carrier.

11. The device according to claim 10, wherein:
the first axial gap motor is one of a plurality of first axial gap motors,
the second axial gap motor is one of a plurality of first axial gap motors,
the at least one crankshaft is one of a plurality of crankshafts, and
each of the crankshafts has one of the first axial gap motors and one of the second axial gap motors attached thereto such that either the respective rotors or the respective stators of the first and the second axial gap motors directly oppose each other.

12. A driving device comprising:
a plurality of input shafts supported by a supporting member;
a driven member engaged with the input shafts, the input shafts each axially extending beyond both sides of the driven member;
a plurality of first axial gap motors; and
a plurality of second axial gap motors;
wherein:

each of the input shafts has one of the first axial gap motors and one of the second axial gap motors attached to one end of the input shaft between a first axial end of the input shaft and the driven member and such that the first axial gap motor faces the second axial gap motor, and a brake is attached to a second axial end of at least one of the input shafts.

13. The driving device according to claim 12, wherein the brake is attached to the second axial end of at least two of the input shafts.

* * * * *